US006205653B1

(12) United States Patent
Perez et al.

(10) Patent No.: US 6,205,653 B1
(45) Date of Patent: Mar. 27, 2001

(54) DEVICE FOR ON-SITE MOUNTING OF A CONNECTOR ON A COAXIAL CABLE

(75) Inventors: Manuel Perez, Le Plessis Robinson; Bernard Archer, Linas, both of (FR)

(73) Assignee: TRT Lucent Technologies SA, Le Plessis Robinson (FR)

( * ) Notice: Subject to any disclaimer, the term of this patent is extended or adjusted under 35 U.S.C. 154(b) by 0 days.

(21) Appl. No.: 09/155,634

(22) PCT Filed: Apr. 14, 1997

(86) PCT No.: PCT/FR97/00654

§ 371 Date: Apr. 9, 1999

§ 102(e) Date: Apr. 9, 1999

(87) PCT Pub. No.: WO97/39500

PCT Pub. Date: Oct. 23, 1997

(30) Foreign Application Priority Data

Apr. 15, 1996 (FR) ........................ 96 04975

(51) Int. Cl.[7] ........................ B23P 19/00

(52) U.S. Cl. ........................ 29/748; 29/751

(58) Field of Search ........................ 29/748, 33 M, 29/DIG. 104, 751

(56) References Cited

U.S. PATENT DOCUMENTS

| | | | | |
|---|---|---|---|---|
| 3,325,885 | * | 6/1967 | Ziegler, Jr. et al. . | |
| 4,674,833 | * | 6/1987 | Des Forges et al. | 350/96.21 |
| 4,797,121 | * | 1/1989 | Hayward | 439/579 |
| 4,897,050 | * | 1/1990 | Randolph | 439/585 |
| 4,904,204 | * | 2/1990 | Heng et al. | 439/425 |
| 4,990,106 | * | 2/1991 | Szegda | 439/585 |
| 5,392,508 | * | 2/1995 | Holliday et al. | 29/751 |
| 5,743,131 | * | 4/1998 | Holliday et al. | 72/409.1 |

FOREIGN PATENT DOCUMENTS

| | | |
|---|---|---|
| 42 23 146 | 1/1994 | (DE) . |
| 43 27 356 | 2/1995 | (DE) . |

* cited by examiner

*Primary Examiner*—Lee Young
*Assistant Examiner*—Sean Smith
(74) *Attorney, Agent, or Firm*—Nilles & Nilles SC

(57) ABSTRACT

A device useful in the field of digital telecommunications, particularly for on-site mounting of a connector on a coaxial cable which has a portable clip (10) adaptable to the diameter of the coaxial cable in order to immobilize the cable. The clip includes a base with a first edge, an opposed second edge and a reference plane formed therebetween. The reference plane supports the coaxial cable and includes a groove formed therein adapted to receive a ferrule of a connector.

9 Claims, 2 Drawing Sheets

21
24
25
29
30
31
33
34
35
36
37
38
39
22
23
26
32
40
27
28

DEVICE FOR ON-SITE MOUNTING OF A CONNECTOR ON A COAXIAL CABLE

BACKGROUND OF THE INVENTION

The present invention relates to a device used for the on-site fitting of a connector on a coaxial cable. The application of the invention lies, more particularly, in the field of digital telecommunications.

Links within a telecommunications network are made using cables and directional radio. Directional radio involves point-to-point links using microwaves in the range 1 GHz–50 GHz as the transmission medium. A radio link makes it possible to establish two-way communication between two terminal stations, it being possible for the communication to be routed via intermediate stations separated from one another by about 50 kilometres. Each station is then connected to a telecommunications landline network.

The equipment of these stations essentially consists of an antenna and a transmitter/receiver. The antenna is usually composed of a horn-shaped aperture which radiates a wave carried by a wave guide, and one or more deflectors of parabolic general shape. The radiating aperture is always located at the focus of the parabola. The waveguide is connected by its other end to a transmitter/receiver located in a room close to the antenna.

However, the waveguide is a very expensive transmission medium. Therefore, in order to limit the length of the waveguide, the transmitter/receiver has for some years been installed directly on the antenna. The transmitter/receiver is then connected to the antenna via a short waveguide and to the telecommunications landline network via a coaxial cable which is less expensive than the waveguide.

The coaxial cable is a high-frequency medium consisting of an inner copper conductor surrounded by a concentric screen, made of copper or aluminium and in principle at the potential of the earth. They are separated by a polyethylene dielectric. The cable is furthermore covered with an insulating sheath.

In order to make it easier to install the coaxial cable on the pylon which supports the antenna, and in order to adjust its length optimally, the connector joining the cable to the transmitter/receiver is fitted once the cable is in place. The connector essentially comprises a core and a ferrule. The core is a hollow metal rod into which the central conductor of the coaxial cable is inserted and soldered. The ferrule is a metal ring which will be placed around the screen of the cable.

The operations which need to be carried out on the coaxial cable when fitting a connector to the cable are essentially operations of cutting and stripping the insulating sheath of the cable. This preparation of the cable is followed by a step of positioning and welding the elements of the conductor on the coaxial cable.

FIGS. 1A and 1B illustrate the positioning of two types of connectors on coaxial cables having different diameters. In both figures, a connector consisting of a core 1 and a ferrule 2 is fitted on a coaxial cable 3. Orifices 5 and 6 are provided respectively in the core 1 and in the ferrule 2 in order to solder the core 1 on the central conductor 4 of the coaxial cable 3, and the ferrule 1 on the screen of this coaxial cable 3. The connectors which are represented are of the N type in FIG. 1A and of the TNC type in FIG. 1B. The dimensions of the elements of the connectors differ according to the type of connector. The positioning of the core 1 on the coaxial cable 3 is represented by a value d in FIG. 1A and by a value d' in FIG. 1B. These values represent the distance between a shoulder situated close to the tip of the core and the end of the polyethylene dielectric. The values d and d' are respectively 15 millimeters and 6 millimeters.

The quality of the fitting of the connector on the coaxial cable is of essential importance in the field of digital telecommunications. This is because the transmission of digital data will not tolerate possible bad contacts in the connector. Bad contacts of this type often give rise to synchronization losses or breaks in connection.

However, it may sometimes be very difficult to fit the connectors. This is because the operation is generally carried out on site, at windy places and in all weathers. In the case of maintenance, these unfavourable working conditions are further aggravated by the fact that it is common practice to work at night, when the network activity is less.

It will then be understood that all these conditions can lead to connection faults.

OBJECT AND SUMMARY OF THE INVENTION

One object of the invention is to provide ergonomic tools for the on-site fitting of a connector on a coaxial cable.

To this end, the invention consists of a device used for on-site fitting of a connector on a coaxial cable, characterized in that it includes a portable clip which can be adapted to the diameter of the coaxial cable in order to immobilize the coaxial cable.

In order to make it possible to grip the coaxial cable by hand for the operations of cutting and stripping the cable, the clip may have a cylindrical external shape of appropriate diameter. In a preferred embodiment, this diameter is about 4 centimeters. This clip will then constitute a device which makes it easier to hold the end of a coaxial cable in one hand.

For the operations of soldering the core and the ferrule of the connector, another device may be provided which is characterized in that it includes a clip having at least one channel for receiving a coaxial cable, as well as positioning means for putting the connector elements in position for assembly on the coaxial cable.

The clip preferably comprises two channels, each for receiving a coaxial cable with a different diameter.

Furthermore, fastening means are provided for fastening the device to a point of the site, for example on a pylon element.

BRIEF DESCRIPTION OF THE DRAWINGS

Other characteristics and advantages of the invention will become apparent on reading the following detailed description, which is given with reference to the appended drawings, in which.

DESCRIPTION OF THE PREFERRED EMBODIMENTS

Figure 1A:
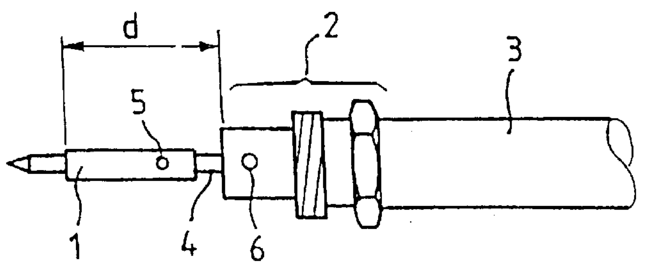
FIGS. 1A and 1B are diagrams of the positioning of two types of connectors on two coaxial cables of different diameters.
Figure 1B:
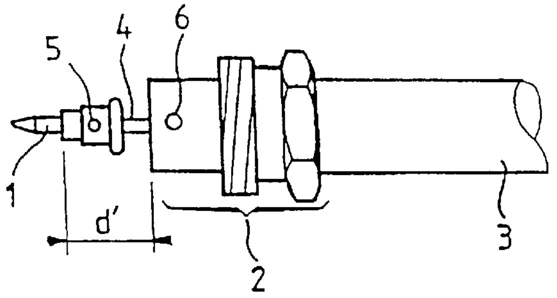

FIGS. 1A and 1B have already been described in the preamble of the description.

Figure 2A:
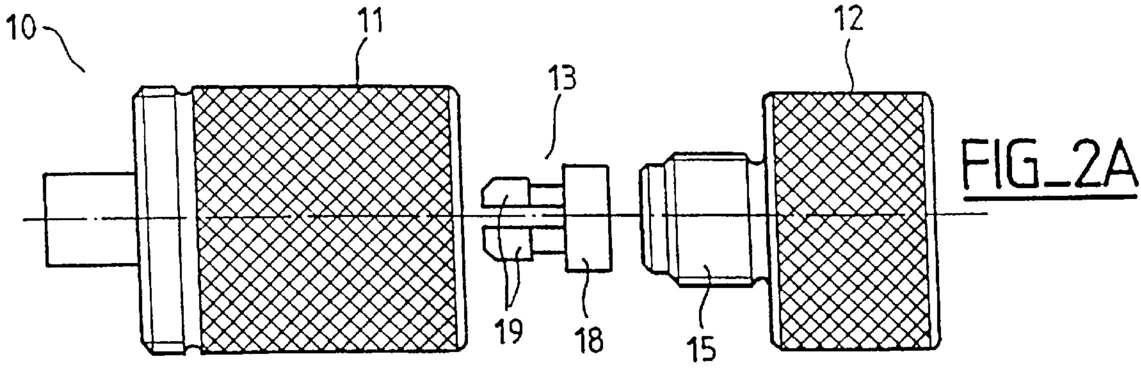
FIGS. 2A and 2B are respectively an exploded view and a sectional view of a device according to the invention for gripping a coaxial cable by hand.
Figure 2B:
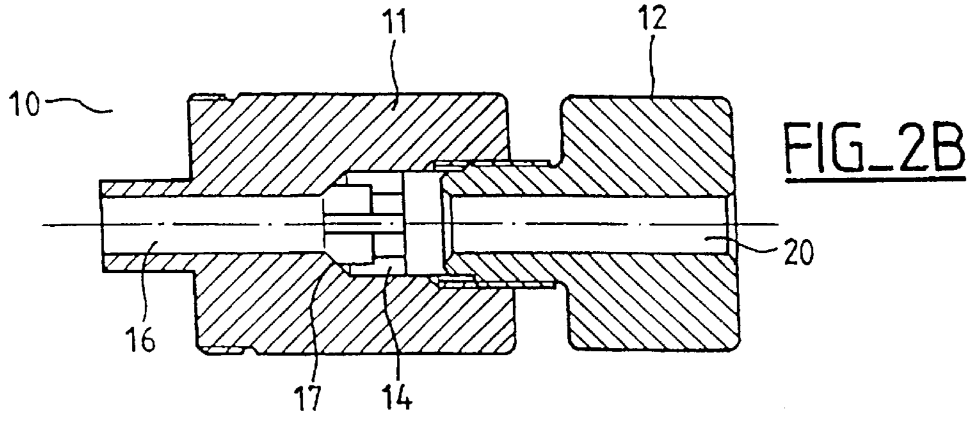

FIG. 2A and FIG. 2B are respectively an exploded view and a sectional view of a device 10 according to the invention for gripping a coaxial cable by hand. Because they complement one another, these two figures will be described together. This device 10 is a portable clip which adapts to the diameter of a cable by means of a cable clamp. It is composed of three elements: a female part 11, a male part 12 and a cable clamp 13.

The female part 11 essentially comprises a cylindrical body whose diameter and external surface condition are designed so that they can be gripped readily by hand. The diameter of the cylindrical body is about 4 to 5 centimeters. A bore 14 for receiving an end-piece 15 of the male part 12 passes axially through this body. This bore 14 continues in the channel 16 for passing a coaxial cable through. The bore 14 is screw-threaded near its entry orifice, while at its inner end it terminates in a conical bearing surface 17 forming the junction with the channel 16. The conical bearing surface 17 is intended to interact with the cable clamp 13.

The cable clamp 13 is inserted like a piston into the bore 14 of the female part 11. This cable clamp 13 consists of a cylindrical ring 18 continuing in a set of jaws 19 with conical ends, interacting with the conical bearing surface 17 of the female part 11. The male part 12 abuts against the cable clamp 13.

The male part 12 consists of a cylindrical part with the same diameter and the same external condition as the female part 11. This cylindrical part continues in a screw-threaded end-piece 15 intended to be screwed into the screw-threaded part of the bore 14 of the female part 11.

Furthermore, a channel 20, through which a cable is intended to be passed, extends axially through the male part 12. When this male part 12 has been engaged in the female part 11, the channel 20 lies in continuation of the channel 16 of the female part 11.

It is very simple to use this tool for holding a coaxial cable. First, the male part 12 is unscrewed from the female part 11, so that the set of jaws 19 is in an open position. Secondly, the coaxial cable is passed through the channel 20, the ring 18 and the channel 16, and the male part 12 is screwed on.

As the end-piece 15 moves through the bore 14, the set of jaws 19 closes on the cable and locks it in place.

This tool allows the coaxial cable to be gripped substantially better by hand. In particular, it allows gloves to be kept on when carrying out the stripping operations on the coaxial cable.

Figures 3A, 3B, 3C:
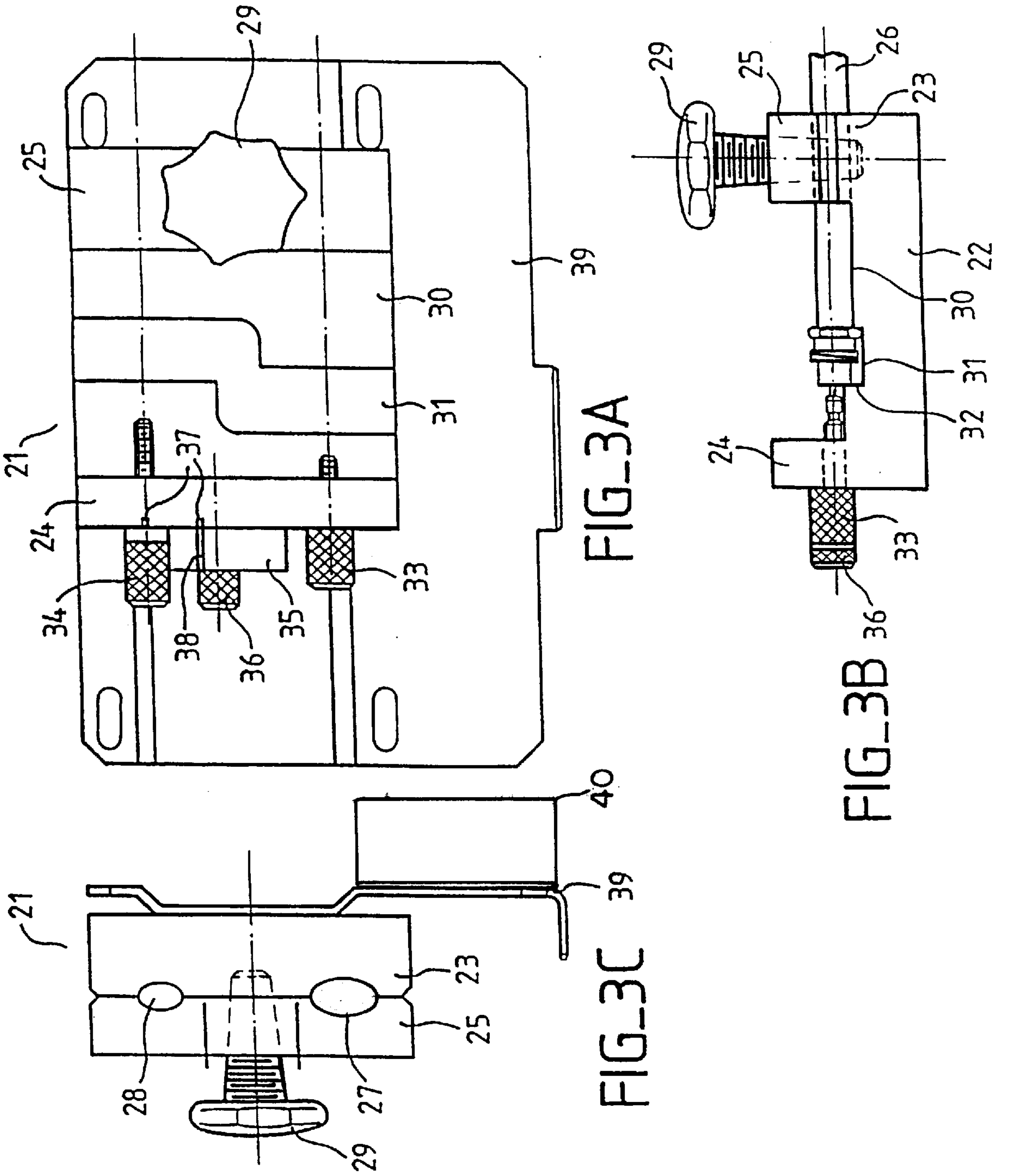
FIGS. 3A to 3C respectively represent a front view, a profile view and a side view of a device for holding and positioning the end of a coaxial cable with respect to a connector according to the invention.

FIGS. 3A to 3C are respectively a plan view, a profile view and a side view of a positioning device 21 according to the invention, used for holding and positioning a coaxial cable and a connector with a view to assembling them. As with FIGS. 2A and 2B, FIGS. 3A to 3C will be described together. For the sake of clarity, an element which is labelled 39 is not represented in FIG. 3B. Furthermore, a coaxial cable provided with a connector is placed in the positioning device 21 in order to illustrate the use of the device.

The positioning device 21 comprises a base 22 continuing vertically on one side in a first edge 23, and on the opposite side in a second edge 24. On top of the first edge 23, there is a clamping block 25 intended to form a clip for locking a coaxial cable 26 in place. The clip has two channels 27 and 28 for receiving the coaxial cables. Each channel consists of two grooves made transversely in the opposing surfaces of the edge 23 and the clamping block 25. The cross-sections of the different channels are preferably adapted to different diameters of coaxial cable. A clamping screw 29 passes vertically through the block 25 and engages in the edge 23 in order to make it possible to lock the coaxial cables 26 in place in their respective channels.

The base 22 also comprises a reference plane 30 on which the coaxial cables 26 bear. This reference plane 30 lies in continuation of the channels 27 and 28 of the clip and is delimited, on one side, by the edge 23 and, on the other side, by a groove 31. The groove 31 makes it possible to position the ferrule of the connector on the screen of the coaxial cable once the latter has already been cut and stripped. The width and depth of the groove 31 are designed so as to obtain optimum purchase of the ferrule in the groove 31. A lip 32 of the groove 31 is slightly raised so that the dielectric of the coaxial cable abuts against this lip.

Furthermore, the device 21 also includes means for positioning and holding the core of the connector on the central conductor of the coaxial cable. This is why the second edge 24 has two knurled screws 33 and 34 passing through it, the screws being positioned respectively in alignment with the axes of the channels 27 and 28 of the clip. The stems of the knurled screws are axially pierced close to their free end in order to receive the core of the connector, the inner conductor of the coaxial cable having already been inserted into the core of the connector. The length of the stems of the knurled screws depends on the type of connector which will be fitted on the coaxial cable.

In order to make it possible to fit two types of connector on the same model of coaxial cable, a hammerhead-shaped stop 35 is provided. The stop 35 then makes it possible to adjust the length of the stem of the screw 34 emerging from the edge 24. The stop 35 is produced in such a way that it can move along the edge 24 and is kept fixed to this edge by a knurled screw 36. Notches 37 on the edge 24, and a notch 38 on the stop 35, make it possible to position the stop 35 accurately relative to the knurled screw 34.

Finally, a support 39 is provided in order to attach the positioning device 21 to a separate structure 40 (e.g., a pylon element) using, for example, a vise or clamping collars.

What is claimed is:

1. A coaxial cable fitting device for the on-site fitting of a connector onto a coaxial cable, wherein the connector includes a core and a ferrule, the fitting device comprising:

a base including a first edge, an opposed second edge, and a base surface formed therebetween, wherein the base surface supports the coaxial cable, a groove formed in the base surface supports the ferrule and at least one knurled screw passes through at least one bore formed in the second edge a clamping block coupled to the first edge, wherein a first channel and a second channel are each formed transversely in a first edge surface of the first edge and in an opposed clamping block surface of the clamping block, a first cross-section of the first channel and a second cross-section of the second channel are each adapted to a diameter of the cable, and a first axis corresponding to a channel length of the first channel and the second channel is parallel to a second axis corresponding to a screw length of the at least one knurled screw; and a clamping screw extending vertically through the clamping block and into the first edge to immobilize the coaxial cable.

2. A device according to claim 1, wherein a diameter of the first cross-section is different than a diameter of the second cross-section.

3. A device according to claim 1, wherein the groove includes a raised lip configured to restrict lateral movement of the ferrule towards the second edge.

4. A device according to claim 1, wherein the at least one knurled screw includes a stem that is axially pierced on a free end and configured to receive the core of the connector.

5. A device according to claim 4, wherein the length of the stem of the at least one screw is determined by the type of the connector to be fitted on the coaxial cable.

6. A device according to claim 1, wherein a stop is attached to the second edge with a stop screw.

7. A device according to claim 6, wherein the length of a stem of the at least one knurled screw depends on the type of the connector that is fitted on the coaxial cable.

8. A coaxial cable fitting device for the on-site fitting of a connector onto a coaxial cable, wherein the connector includes a core and a ferrule, the fitting device comprising:

a base including a first edge, an opposed second edge, and a base surface formed therebetween, wherein the base surface supports the coaxial cable, at least one knurled screw passes through at least one bore formed in the second edge, and a groove formed in the base surface and supporting the ferrule includes a raised lip that restricts lateral movement of the ferrule towards the second edge;

a clamping block coupled to the first edge, wherein a first channel and a second channel are each formed transversely in a first edge surface of the first edge and in an opposed clamping block surface of the clamping block, a first cross-section of the first channel and a second cross-section of the second channel are each adapted to a diameter of the cable, and a first axis corresponding to a channel length of the first channel and the second channel is parallel to a second axis corresponding to a screw length of the at least one knurled screw; and a clamping screw extending vertically through the clamping block and into the first edge to immobilize the coaxial cable.

9. A coaxial cable fitting device for the on-site fitting of a connector onto a coaxial cable, wherein the connector includes a core and a ferrule, the fitting device comprising:

a base including a first edge, an opposed second edge, and a base surface formed therebetween, wherein the base surface supports the coaxial cable, at least one knurled screw passes through at least one bore formed in the second edge, and a groove formed in the base surface supports the ferrule;

a clamping block coupled to the first edge, wherein a first channel and a second channel are each formed transversely in a first edge surface of the first edge and in an opposed clamping block surface of the clamping block; and wherein a first cross-section of the first channel and a second cross-section of the second channel are each adapted to a diameter of the cable, and a first axis corresponding to a channel length of the first channel and the second channel is parallel to a second axis corresponding to a screw length of the at least one knurled screw.

* * * * *